US 6,728,063 B1

(12) United States Patent
Gustafson et al.

(10) Patent No.: US 6,728,063 B1
(45) Date of Patent: Apr. 27, 2004

(54) SPINDLE MOTOR HAVING SPINDLE MOTOR STATOR FOR INCREASED HEAD STACK ASSEMBLY ACCESS

(75) Inventors: John R. Gustafson, Los Gatos, CA (US); Jonathan M. Garbarino, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 233 days.

(21) Appl. No.: 09/846,749

(22) Filed: Apr. 30, 2001

(51) Int. Cl.⁷ .................. G11B 17/02; G11B 33/12
(52) U.S. Cl. .................................... 360/99.08
(58) Field of Search ............... 360/99.08, 98.07, 360/99.04

(56) References Cited

U.S. PATENT DOCUMENTS

| | | | | |
|---|---|---|---|---|
| 4,620,301 A | * | 10/1986 | Koide | |
| 4,870,518 A | * | 9/1989 | Thompson et al. | |
| 4,873,596 A | * | 10/1989 | Harada et al. | 360/99.04 |
| 5,124,863 A | * | 6/1992 | Koizumi et al. | 360/99.08 |
| 5,296,981 A | | 3/1994 | Ogawa | |
| 5,319,270 A | * | 6/1994 | Tanaka et al. | 360/99.04 |
| 6,078,467 A | * | 6/2000 | Akutsu et al. | 360/99.08 |

* cited by examiner

Primary Examiner—Craig A. Renner
(74) Attorney, Agent, or Firm—Won Tae C. Kim, Esq.; Milad G. Shara, Esq.; Stetina Brunda Garred & Brucker

(57) ABSTRACT

A spindle motor for use in a disk drive having a rotatable head stack assembly. The spindle motor has a spindle motor hub having an axis of rotation. The spindle motor has a magnet radially attached about the spindle motor hub. The spindle motor has a spindle motor stator having a stator rim and a plurality of stator teeth arrayed about and internally extending from the stator rim towards the axis of rotation. The stator teeth being are to fit about the magnet in operable communication therewith for rotating the spindle motor hub. Two respective ones of the stator teeth are spaced apart along the stator rim to allow the head stack assembly to pivot between the two respective ones of the stator teeth.

12 Claims, 4 Drawing Sheets

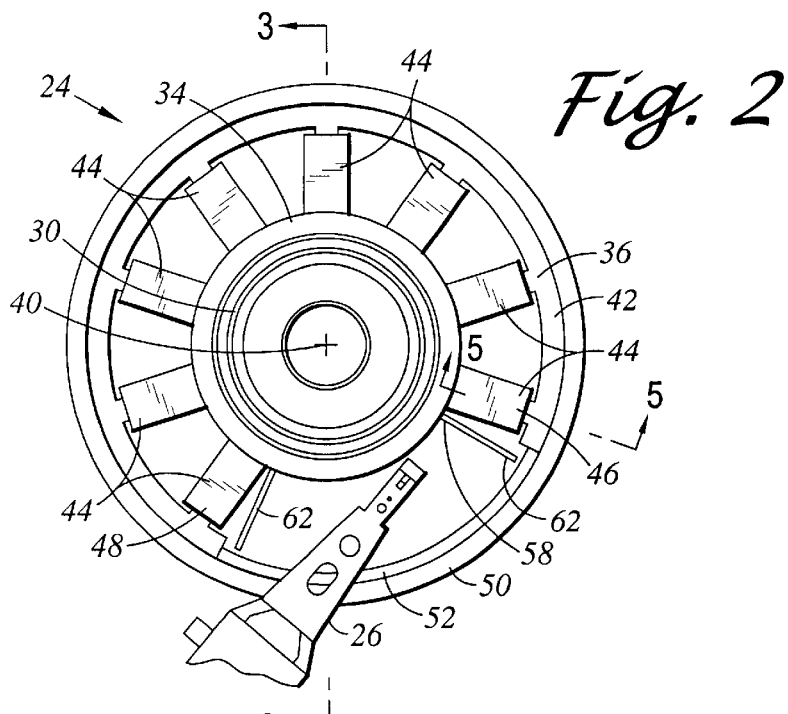
Fig. 2
Fig. 3
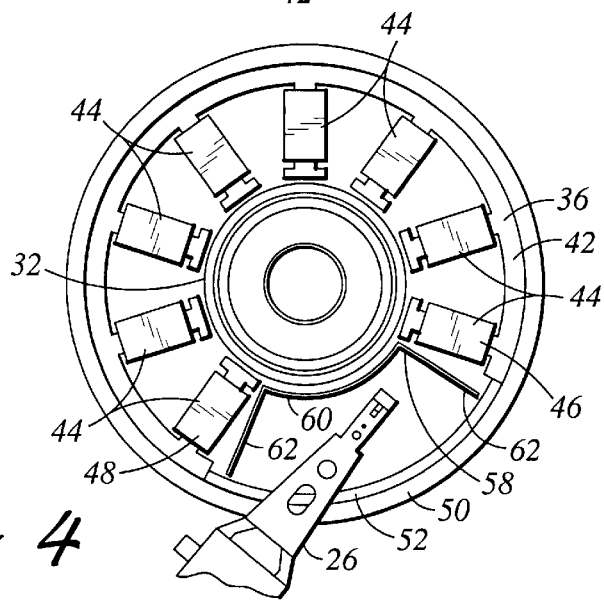
Fig. 4

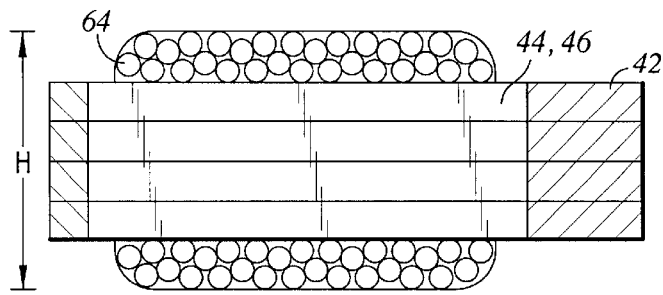
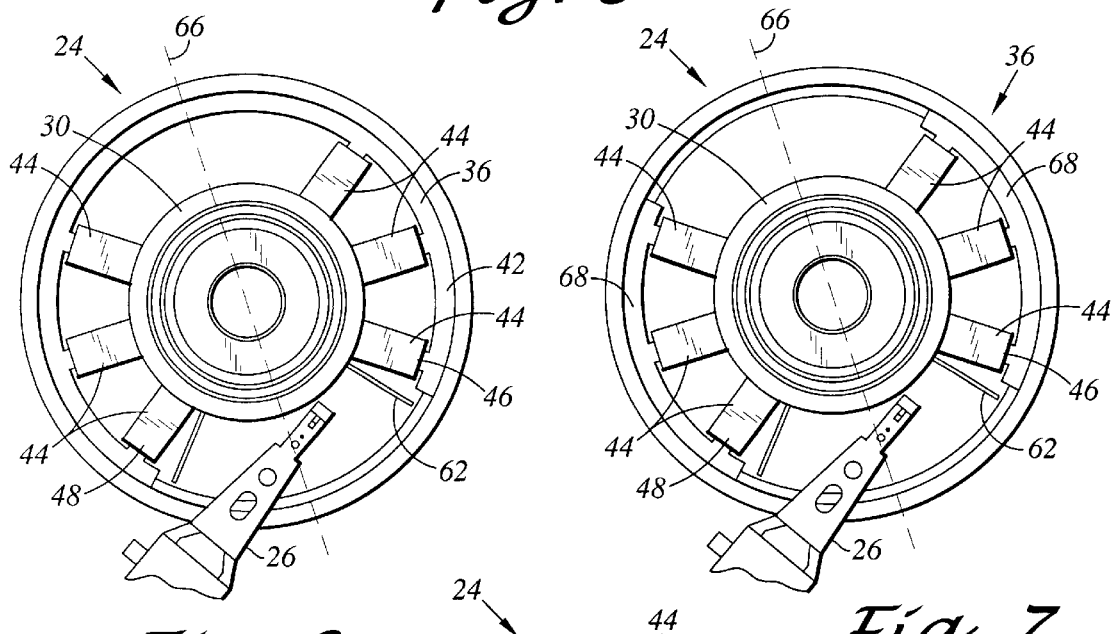
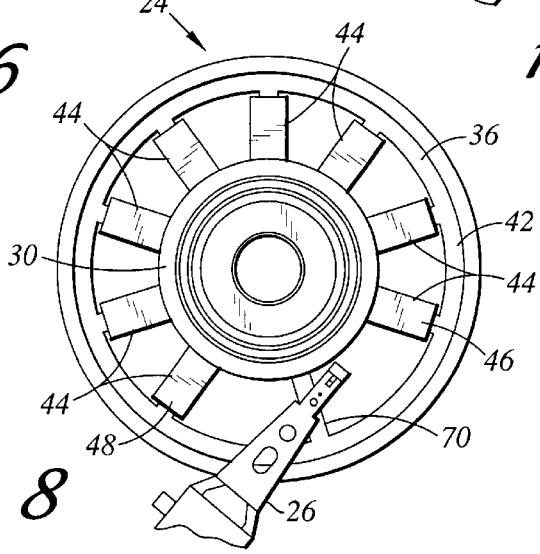

SPINDLE MOTOR HAVING SPINDLE MOTOR STATOR FOR INCREASED HEAD STACK ASSEMBLY ACCESS

CROSS-REFERENCE TO RELATED APPLICATIONS

BACKGROUND OF THE INVENTION

Not Applicable.

1. Field of the Invention

The present invention relates generally to spindle motors for use in disk drives, and more particularly to a spindle motor having a spindle motor stator for increased head stack assembly access.

2. Description of the Prior Art

The typical hard disk drive includes a disk drive base, and a head disk assembly (HDA) and a printed circuit board assembly (PCBA) attached to the disk drive base. The head disk assembly includes at least one magnetic disk, a spindle motor for rotating the disk, and a head stack assembly (HSA) that includes at least one transducer head, typically several, for reading and writing data to and from the disk. The printed circuit board assembly includes a servo control system in the form of a disk controller for generating servo control signals. The head stack assembly is controllably positioned in response to the generated servo control signals from the disk controller., In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms which that extend from an opposite side of the actuator body. A head gimbal assembly includes at least one transducer head, sometimes two, which is distally attached to each of the actuator arms. The actuator assembly includes the actuator body which has a bore and a pivot bearing cartridge engaged within the bore. The at least one head gimbal assembly and the flex circuit cable assembly are attached to the actuator assembly.

The spindle motor includes a hub that is rotatably attached to the disk drive base. The hub has an outer flange that supports one of the disks. Additional disks may be stacked and separated with spacers. The spindle motor further includes an annular magnet and a spindle motor stator. Where space efficiency is of vital concern, the magnet is typically attached about the lowermost portion of the hub below the flange. The magnet consists of a predetermined number of N and S poles that are disposed alternately circumferentially about the magnet. The spindle motor stator includes an outer rim that is attached to the disk drive base and a plurality of internally facing stator teeth. The stator teeth are equally spaced and extend from the stator rim. The spindle motor stator is sized to fit about the hub and in particular the magnet. Each stator tooth includes windings which selectively conduct current to create a magnetic field that interacts with the various poles of the magnet. Such interaction results in forces applied to the hub which tend to rotate the hub. In those disk drives capable of reading both sides of the disks, the head stack assembly includes an actuator arm which extends and pivots between the vertical region between the lowermost disk and the spindle motor stator. A magnetic shield is provided between the head stack assembly in such region over the stator teeth for protecting against magnetic flux interacting with the magnetic data on the disk and the head stack assembly.

A topic of concern is the desire to reduce the overall disk drive size. Such disk drives may have a variety of applications such as in hand held or portable electronic devices. The exterior size and shape of the disk drive is often referred to as a "form factor". Reduction of such disk drive form factor has proven challenging. This is because the mere reduction of the size of the various disk drive components may result in such components being unable to conform to required specifications and standard form factors for such components, and may result in installation or assembly difficulties.

One particular area of focus is the reduction of the height of the disk drive. As mentioned above, a prior art arrangement includes a lower actuator arm that extends and pivots between the vertical region between the lowermost disk and the spindle motor stator. Such prior arrangement is contemplated to be a limited factor in the overall sizing of the disk drive height. Accordingly, there is a need in the art for an improved spindle motor configuration in comparison to the prior art.

SUMMARY OF THE INVENTION

An aspect of the invention can be regarded as a spindle motor for use in a disk drive having a rotatable head stack assembly. The spindle motor has a spindle motor hub having an axis of rotation. The spindle motor further has a magnet radially attached about the spindle motor hub. The spindle motor further has a spindle motor stator having a stator rim and a plurality of stator teeth arrayed about and internally extending from the stator rim towards the axis of rotation. The stator teeth are sized to fit about the magnet in operable communication therewith for rotating the spindle motor hub. Two respective ones of the stator teeth are spaced apart along the stator rim to allow the head stack assembly to pivot between the two respective ones of the stator teeth.

The stator teeth may be evenly spaced apart along the stator rim. Further, the stator teeth may be symmetrically arrayed about an axis bisecting the stator rim between the spaced apart two respective ones of the stator teeth. The stator rim may be formed as a single or segment or as multiple segments. A magnetic shield may be provided between the spaced apart two respective ones of the stator teeth adjacent the magnet for shielding the head stack assembly from the magnet. The magnetic shield may have two radial portions extending from adjacent the magnet towards the stator rim respectively adjacent each of the spaced apart two respective ones of the stator teeth for shielding the head stack assembly from the spaced apart two respective ones of the stator teeth.

According to another aspect of the present invention there is provided a spindle motor for use in a disk drive having a rotatable head stack assembly. The spindle motor has a spindle motor hub. The spindle motor further has a magnet radially attached about the spindle motor hub. The spindle motor further has a spindle motor stator. The spindle motor stator has a stator rim. The spindle motor stator further has a plurality of wound stator teeth arrayed about and internally extending from the stator rim. Windings are formed about the wound stator teeth. The wound stator teeth are sized to fit about the magnet in operable communication therewith for rotating the spindle motor hub. The spindle motor stator further has at least one bare stator tooth internally extending from the stator rim between two respective ones of the wound stator teeth. The at least one bare stator tooth is positionable adjacent the head stack assembly for allowing the head stack assembly to pivot over the at least one bare stator tooth.

In accordance with another aspect of the present invention, there is provided a spindle motor for use in a disk drive having a rotatable head stack assembly. The spindle motor has a spindle motor hub. The spindle motor further has a magnet radially attached about the spindle motor hub. The spindle motor further has a spindle motor stator. The spindle motor stator has a stator rim. The spindle motor stator has a plurality of wound stator teeth arrayed about and internally extending from the stator rim. Windings are formed about the wound stator teeth. The wound stator teeth are sized to fit about the magnet in operable communication therewith for rotating the spindle motor hub. At least one of the wound stator teeth is a reduced winding height stator tooth. Windings are formed about the reduced winding height stator tooth to a winding height less than that of a remainder of the wound stator teeth. The reduced winding height stator tooth is positionable adjacent the head stack assembly for allowing the head stack assembly to pivot over the reduced winding height stator tooth.

In additional embodiments of the present invention, there are provided disk drives each having a disk drive base and a head stack assembly. The above-mentioned stator motors embodiments may be included the disk drives.

BRIEF DESCRIPTION OF THE DRAWINGS

FIG. 2 is a top view of a spindle motor in relation to a portion of the head stack assembly;

FIG. 3 is a cross sectional view of the disk drive including the spindle motor as seen along axis 3—3 of FIG. 2;

FIG. 4 is a top view of the spindle motor as shown in FIG. 2 without a spindle motor hub;

FIG. 5 is a cross sectional view of a stator tooth as seen along axis 5—5 of FIG. 2;

FIG. 6 is top view of a spindle motor according to another aspect of the present invention wherein stator teeth are symmetrically arrayed;

FIG. 7 is a top view of a spindle motor according to another aspect of the present invention wherein a stator rim is formed of two segments;

FIG. 8 is a top view of a spindle motor according to another aspect of the present invention which includes a bare stator tooth.

DESCRIPTION OF THE PREFERRED EMBODIMENTS

Figure 1:
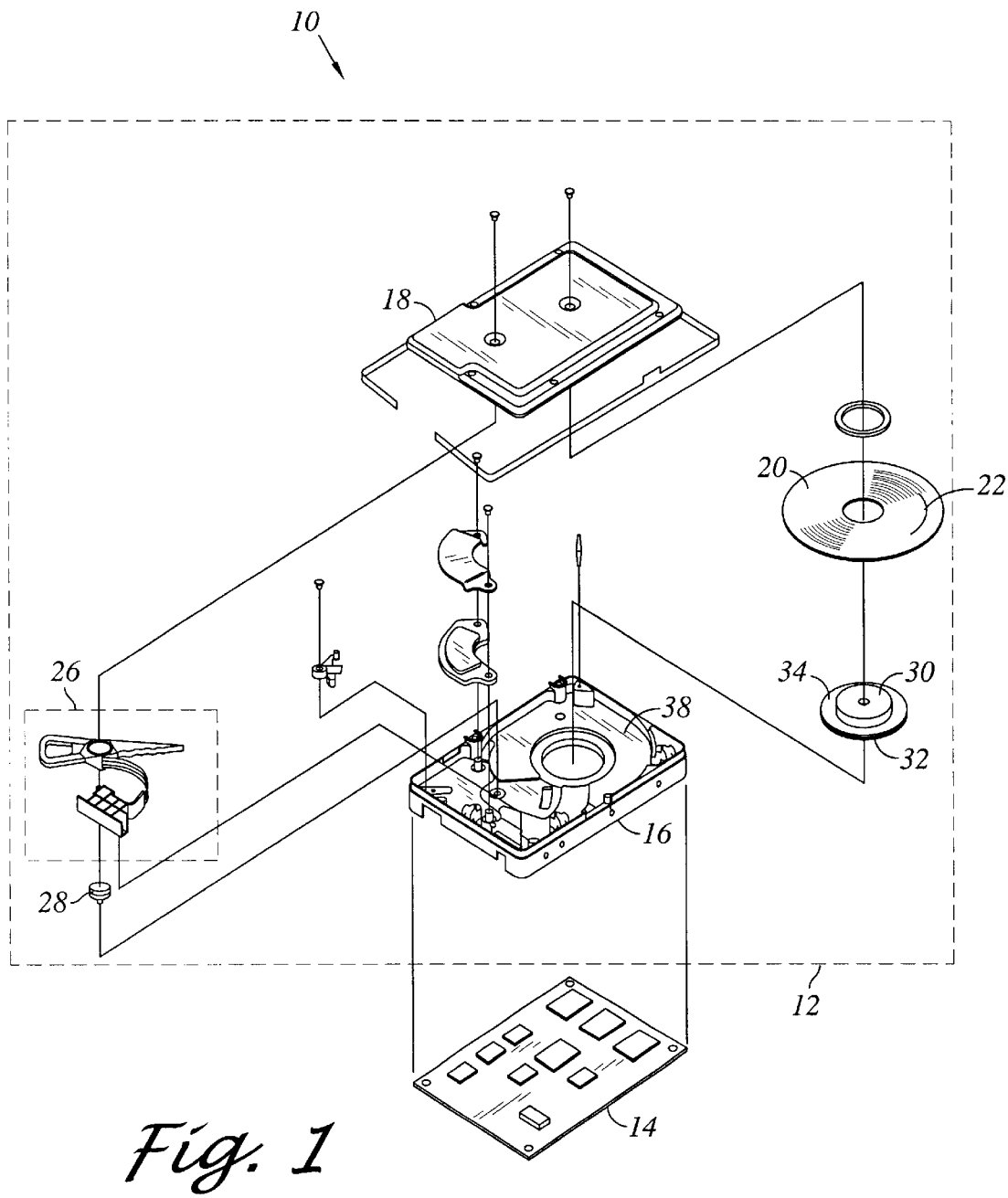
FIG. 1 is an exploded perspective view of a disk drive including a spindle motor as constructed in accordance with an aspect of the present invention.

Referring now to the drawings wherein the showings are for purposes of illustrating preferred embodiments of the present invention only, and not for purposes of limiting the same, FIGS. 1–9 illustrate a disk drive 10 in accordance with the aspects of the present invention.

Referring now to FIG. 1 there is depicted an exploded perspective view a disk drive 10 constructed in accordance with an aspect of the present invention. The disk drive 10 includes a head disk assembly (HDA) 12 and a printed circuit board assembly (PCBA) 14. The head disk assembly 12 includes a disk drive base 16 and a cover 18 that collectively house at least one magnetic disk 20 (although single disk 20 is shown, multiple disks 20 may be included). The disk 20 contains a plurality of tracks 22 for reading and writing data. The head disk assembly 12 further includes a spindle motor 24 (such as shown in FIG. 2) for rotating the disk 20 and a head stack assembly 26. A pivot cartridge 28 is provided for pivoting the head stack assembly 26 relative to the rotating disk 20 for reading and writing data to and from the disk 20.

Referring additionally to FIGS. 2–4, the spindle motor 24 includes a spindle motor hub 30 and an annular magnet 32 disposed about the hub 30. The hub 30 has an annular flange 34 that is configured to support the disk 20. The spindle motor 24 further includes a spindle motor stator 36 (such as shown in FIG. 2) that interacts with the magnet 32 for rotating the spindle motor hub 30 and attached disk 20. Over the spindle motor stator 36, a horizontally disposed magnetic shield 38 is provided which shields the disk 20 and the head stack assembly 26 from magnetic flux generated by the interaction of the magnet 32 and the spindle motor stator 36.

Referring specifically to FIG. 2, there is depicted a top view of the spindle motor 24 according to an aspect of the present invention. In addition, a portion of the head stack assembly 26 is depicted in relation to the spindle motor 24. In order to observe the spindle motor stator 34, the horizontally disposed magnetic shield 38 is not depicted in this view of FIG. 2.

The spindle motor hub 30 has an axis of rotation 40. The spindle motor stator 24 has a stator rim 42 and a plurality of stator teeth 44 arrayed about and internally extending from the stator rim 42 towards the axis of rotation 40. The stator teeth 44 are sized to fit about the magnet 32 in operable communication therewith for rotating the spindle motor hub 30. Two respective ones 46, 48 of the stator teeth 44 are spaced apart along the stator rim 42 to allow the head stack assembly 26 to pivot between the two respective ones 46, 48 of the stator teeth 44.

In this regard, the two respective ones 46, 48 of the stator teeth 44 effectively form a vertical gap or opening in which the head stack assembly 26 may be positioned. The spindle motor stator 36 of this embodiment allows the head stack assembly 26 to be effectively translated downward in comparison to prior art stator arrangements which require the head stack assembly thereof to be above the level of the stator teeth thereof. To the extent that the vertical positioning of the head stack assembly 26 is a limiting factor in the overall height form factor of the disk drive 10, such effective translation directly results in facilitating reduction of such overall height form factor.

Referring specifically to FIG. 3, there is depicted a cross sectional view of the disk drive 10 including the spindle motor 24 of FIG. 2 as seen along axis 3—3. A stator base 50 may be included having a stepped portion 52 sized and configured to seat the stator rim 42. The stator base 50 is attached to the disk drive base 16. It is contemplated that the stator base 50 may be integrally formed with the disk drive base 16. The spindle motor hub 30 is configured to rotate in relation to the stator base 50. In this regard, in one configuration, an annular member 54 may extend from stator base 50. Bearing sets 56 may be provided which are mounted within the spindle motor hub 30 in communication with the annular member 54 for facilitating rotation of the hub 30.

Referring additionally to FIG. 4, there is depicted a top view of the spindle motor 24 as shown in FIG. 2 without the spindle motor hub 30. A substantially vertically disposed magnetic shield 58 may be provided between the spaced apart two respective ones 46, 48 of the stator teeth 44 adjacent the magnet 32 for shielding the head stack assembly 26 from the magnet 32. The magnetic shield 58 may include an annular segment 60 which is positioned adjacent the magnet 32. The magnetic shield 58 may further have two radial portions 62 extending from the annular segment 60 adjacent the magnet 32 towards the stator rim 42 respectively adjacent each of the spaced apart two respective ones 46, 48 of the stator teeth 44 for shielding the head stack assembly 26 from the spaced apart two respective ones 46, 48 of the stator teeth 44. The magnetic sheid 58 may extend from and be attached to stator base 50 as shown.

Referring now to FIG. 5, there is depicted a cross sectional view of one of the stator teeth 44, an in particular 46, as seen along axis 5—5 of FIG. 2. The stator tooth 46 is representative of a remainder of the stator teeth 44. In this regard, each of the stator teeth 44, including 46, includes windings 64 thereabout. The windings 64 of each of the stator teeth 44 selectively conducts current to create a magnetic field that interacts with various poles of the magnet 32. Such interaction results in forces applied to the spindle motor hub 30 which tend to rotate the spindle motor hub 30. The windings 64 have a total vertical height H.

It is contemplated that the motor torque constant of the spindle motor 24 is a function of the number of stator teeth 44, flux density through each of the stator teeth 44, the number of windings 64 about each stator tooth 44, and the radial distance between the stator tooth 44 and the magnet 30. In this regard, the number of stator teeth 44 may vary depending upon the overall motor torque constant desired for the spindle motor 24. It is contemplated that such spindle motors 24 for use in disk drives 10 are of a three phase nature. As such, it is desirable that the number of stator teeth 44 is divisible by three.

Advantageously, such foregoing spindle motor stator 36 configurations may utilize standard stator tooth designs with the exception of selectively "missing" stator teeth 44 so as form the spaced apart nature between the respective ones 46, 48 of the stator teeth 44. This takes advantage of pre-existing tooling and fabrication processes for constructing and assembling the spindle motor stator 36.

The stator teeth 44 may be evenly spaced apart along the stator rim 42 as shown in FIGS. 2 and 4. This contemplates the exception of the region between the two respective ones 46, 48 of the stator teeth 44. Further, as shown in FIG. 6, the stator teeth 44 may be symmetrically arrayed about an axis 66 bisecting the stator rim 42 between the spaced apart two respective ones 46, 48 of the stator teeth 44. Such symmetry is contemplated to tend to balance those magnetic flux forces experienced by the hub 30 which tend to cause a moment about an axis in the plane of rotation (i.e., so as to result in a net force or moment in the plane of rotation for rotating the hub 30). In addition, the stator rim 42 may be formed as a single segment such as shown in FIG. 6. Alternatively, the stator rim 42 may be formed in multiple segments 68 as depicted in FIG. 7.

As mentioned above, windings 64 may be formed about the stator teeth 44. According to another aspect of the present invention, the spindle motor stator further has at least one bare stator tooth 70 internally extending from the stator rim 42 between two respective ones 46, 48 of the wound stator teeth 44 as shown in FIG. 8. In this regard the bare stator tooth 70 does not include any windings, such as those windings 64 of the wound stator teeth 44. The at least one bare stator tooth 70 is positionable adjacent the head stack assembly 26 for allowing the head stack assembly 26 to pivot over the at least one bare stator tooth 70. The spindle motor stator 36 of this embodiment allows the head stack assembly 26 to be effectively translated downward by the winding height of the windings 64 of the remainder of the stator teeth 44 in comparison to prior art stator arrangements which require that all of the stator teeth 44 have windings 64.

Figure 9:
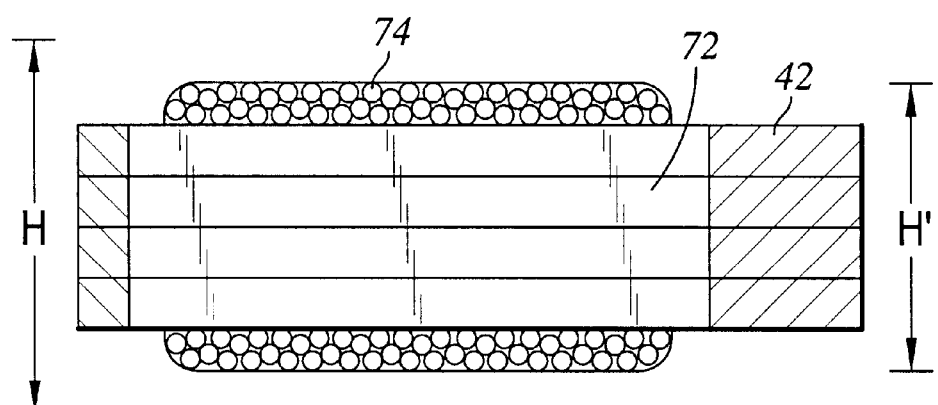
FIG. 9 is a cross sectional view of a reduced winding height stator tooth according to another aspect of the present invention.

In accordance with another aspect of the present invention, a reduced winding height stator tooth 72 having reduced height windings 74 may be provided as shown in FIG. 9. In comparison to the embodiment shown in FIG. 8, the bare tooth 70 is wound. The reduced height windings 74 are formed about the reduced winding height stator tooth 72 to a winding height H' less than that of a remainder of the wound stator teeth 44 (i.e., to a height H). The reduced winding height stator tooth 72 is positionable adjacent the head stack assembly 26 for allowing the head stack assembly 26 to pivot over the reduced winding height stator tooth 72. The spindle motor stator 36 of this embodiment allows the head stack assembly 26 to be effectively translated downward by the difference of the winding heights H and H' in comparison to prior art stator arrangements which require that all of the stator teeth 44 have equally would heights. Various methods of achieving such reduced winding height is contemplated which include utilizing few number of windings, reduced gauge wire, and forming of the windings.

We claim:

1. A spindle motor for use in a disk drive having a rotatable head stack assembly, the spindle motor comprising:
   a spindle motor hub having an axis of rotation;
   a magnet radially attached about the spindle motor hub; and
   a spindle motor stator including:
      a stator rim; and
      a plurality of stator teeth arrayed about and internally extending from the stator rim towards the axis of rotation, the stator teeth being sized to fit about the magnet in operable communication therewith for rotating the spindle motor hub, a first two respective ones of the stator teeth being spaced apart along the stator rim to form a first spacing between the first two respective ones of the stator teeth to allow the head stack assembly to pivot between the two respective ones of the stator teeth, a second two respective ones of the stator teeth being spaced apart a same distance as the first two respective ones of the stator teeth along the stator rim to form a second spacing between the second two respective ones of the stator teeth opposite the first spacing.

2. The spindle motor of claim 1 wherein the stator teeth are evenly spaced apart along the stator rim.

3. The spindle motor of claim 1 wherein the stator teeth are symmetrically arrayed about an axis bisecting the stator rim between the spaced apart first and second two respective ones of the stator teeth.

4. The spindle motor of claim 1 wherein the stator rim is formed of multiple segments.

5. The spindle motor of claim 1 further comprises a magnetic shield between the spaced apart first two respective ones of the stator teeth adjacent the magnet for shielding the head stack assembly from the magnet.

6. The spindle motor of claim 5 wherein the magnetic shield has two radial portions extending from adjacent the magnet towards the stator rim respectively adjacent each of the spaced apart first two respective ones of the stator teeth for shielding the head stack assembly from the spaced apart first two respective ones of the stator teeth.

7. A disk drive comprising:
   a disk drive base;
   a head stack assembly rotatably attached to the disk drive base; and
   a spindle motor attached to the disk drive base including:
   a spindle motor hub having an axis of rotation;
   a magnet radially attached about the spindle motor hub; and
   a spindle motor stator including:
   a stator rim; and
   a plurality of stator teeth arrayed about and internally extending from the stator rim towards the axis of rotation, the stator teeth being sized to fit about the magnet in operable communication therewith for rotating the spindle motor hub, a first two respective ones of the stator teeth being spaced apart along the stator rim to form a first spacing between the first two respective ones of the stator teeth to allow the head stack assembly to pivot between the two respective ones of the stator teeth, a second two respective ones of the stator teeth being spaced apart a same distance as the first two respective ones of the stator teeth along the stator rim to form a second spacing between the second two respective ones of the stator teeth opposite the first spacing.

8. The disk drive of claim 7 wherein the stator teeth are evenly spaced apart along the stator rim.

9. The disk drive of claim 7 wherein the stator teeth are symmetrically arrayed about an axis bisecting the stator rim between the spaced apart first and second two respective ones of the stator teeth.

10. The disk drive of claim 7 wherein the stator rim is formed of multiple segments.

11. The disk drive of claim 7 further comprises a magnetic shield between the spaced apart first two respective ones of the stator teeth adjacent the magnet for shielding the head stack assembly from the magnet.

12. The disk drive of claim 11 wherein the magnetic shield has two radial portions extending from adjacent the magnet towards the stator rim respectively adjacent each of the spaced apart first two respective ones of the stator teeth for shielding the head stack assembly from the spaced apart first two respective ones of the stator teeth.

* * * * *